(12) United States Patent
Benincosa et al.

(10) Patent No.: US 11,821,564 B2
(45) Date of Patent: Nov. 21, 2023

(54) METHOD AND APPARATUS TO EXPORT FLUID WITHOUT DISCHARGE

(71) Applicant: OPERATIONS TECHNOLOGY DEVELOPMENT, NFP, Des Plaines, IL (US)

(72) Inventors: William Benincosa, Chicago, IL (US); Dennis R. Jarnecke, River Forest, IL (US)

(73) Assignee: OPERATIONS TECHNOLOGY DEVELOPMENT, NEP, Des Plaines, IL (US)

( * ) Notice: Subject to any disclaimer, the term of this patent is extended or adjusted under 35 U.S.C. 154(b) by 95 days.

(21) Appl. No.: 17/480,338

(22) Filed: Sep. 21, 2021

(65) Prior Publication Data

US 2022/0090722 A1     Mar. 24, 2022

Related U.S. Application Data

(60) Provisional application No. 63/081,070, filed on Sep. 21, 2020.

(51) Int. Cl.
*F16L 55/07*  (2006.01)
*G01M 3/02*   (2006.01)
*F16L 55/10*  (2006.01)

(52) U.S. Cl.
CPC .......... *F16L 55/07* (2013.01); *F16L 55/1022* (2013.01); *G01M 3/02* (2013.01)

(58) Field of Classification Search
CPC ....... F16L 55/07; F16L 55/1022; G01M 3/02; G01M 3/2815
See application file for complete search history.

(56) References Cited

U.S. PATENT DOCUMENTS

| | | | |
|---|---|---|---|
| 4,346,726 A   | 8/1982 | Bayen et al. | |
| 6,025,788 A * | 2/2000 | Diduck | G01M 3/2807 |
| | | | 340/3.4 |
| 6,056,004 A   | 5/2000 | Agnew | |
| 6,698,469 B2  | 3/2004 | Sakamoto et al. | |
| 7,749,308 B2  | 7/2010 | McCully | |

(Continued)

FOREIGN PATENT DOCUMENTS

| | | |
|---|---|---|
| AU | 2011204907 A1 | 8/2011 |
| JP | 2000-161592 | 6/2000 |

(Continued)

OTHER PUBLICATIONS

U.S. Patent Office, English language version of the International Search Report, Form PCT/ISA/210 for International Application PCT/US2021/051267, dated Jan. 11, 2022 (3 pages).

(Continued)

*Primary Examiner* — Michael R Reid
(74) *Attorney, Agent, or Firm* — Pauley Brickson & Swanson

(57) ABSTRACT

A method and system for pipeline purging with reduced environmental impact. A vacuum and/or compressor system purges air or other gases from at least a section of the pipeline to create a vacuum in the pipeline. The vacuum can then be replaced with a fuel gas, avoiding a mixing of fuel and oxidant in the pipeline. The vacuum and/or compressor system can include a fuel gas monitoring leak-detection system to monitor for fuel presence in the purging air.

16 Claims, 4 Drawing Sheets

(56) References Cited

U.S. PATENT DOCUMENTS

| | | |
|---|---|---|
| 7,866,222 B2 | 1/2011 | Moore et al. |
| 10,443,586 B1 | 10/2019 | Sahm |
| 2008/0118373 A1 | 5/2008 | Richey et al. |
| 2016/0298902 A1 | 10/2016 | Wang et al. |

FOREIGN PATENT DOCUMENTS

| | | |
|---|---|---|
| JP | 2007-211964 | 8/2007 |
| WO | WO 2018/183474 A1 | 10/2018 |
| WO | WO 2018/187605 A1 | 10/2018 |

OTHER PUBLICATIONS

U.S. Patent Office, English language version of the Written Opinion of the ISA, Form PCT/ISA/237 for International Application PCT/US2021/0051267, dated Jan. 11, 2022 (7 pages).

\* cited by examiner

METHOD AND APPARATUS TO EXPORT FLUID WITHOUT DISCHARGE

CROSS REFERENCE TO RELATED APPLICATION

This application claims the benefit of U.S. Provisional Patent Application, Ser. No. 63/081,070, filed on 21 Sep. 2020. The co-pending provisional application is hereby incorporated by reference herein in its entirety and is made a part hereof, including but not limited to those portions which specifically appear hereinafter.

BACKGROUND OF THE INVENTION

Field of the Invention

The invention is related to a process to export gaseous, or non-gaseous, or condensable, or non-condensable fluid in a system without discharge.

Description of Related Art

Pipelines are routinely purged during operations work, which contributes to greenhouse gas emissions due to the venting of process fluids to the atmosphere. Natural gas pipeline purging activities are conducted to bring a pipe into service; the asset is purged with natural gas to push out the air that exists in the pipe. If this activity was not performed, explosive mixtures of natural gas and oxygen would be present in the pipeline which could ignite and cause serious harm. Although this operation is performed for pipeline safety, volumes of natural gas are purposely vented to the atmosphere as an unwanted side effect of this operation which contributes to greenhouse gas emissions. There are no alternatives to purging a pipeline into service, and current technologies/methods still require some form of venting greenhouse gases to the atmosphere. There are few alternatives to venting process fluid to the atmosphere when purging a pipeline out of service and require process fluid to be vented through a purge stack to the atmosphere to verify gas quality.

Purges emit or discharge large amounts of fluids to the environment. This fluid is lost revenue and can be a potential contributor to greenhouse gas emissions. Several attempts to limit these discharges have been proposed with compressors or flares but these are inherently unsafe and do not effectively reduce all emissions.

U.S. Pat. No. 10,443,586 describes a unit for cross compression to reduce the amount of gas that will be vented when a pipeline is purged out of service. U.S. Publication 20160298902A1 describes pulling vacuum on a pipeline for drying but does not address emissions reduction. U.S. Pat. No. 7,749,308 also describes pulling vacuum on pipeline facilities but is focused on pig traps and not a technology applicable to pipeline operations.

Thus there is a continuing need for systems and methods to remove fluids from a pipeline, such as for decommissioning/repair and/or recommissioning/installation.

SUMMARY OF THE INVENTION

The subject invention advances the state of the art for safe and emissions free purging of pipelines or vessels where previously large volumes of fluid traditionally were lost into the environment.

The general object of the invention can be attained, at least in part, through a method for pipeline purging. The method includes steps of creating a vacuum within at least a section of the pipeline, and then, when desired, filing the vacuum with the intended fluid, such as a fuel gas. The fuel gas is generally a flammable gas, such as natural gas, hydrogen, methane, or combinations thereof.

The invention provides a method of removing gaseous fuel or air from a pipeline, or a section thereof, for replacement by, for example, the other of gaseous fuel or air. The goal is to reduce or eliminate mixing of fuel and oxidant (e.g., oxygen) within the pipeline, to minimize or avoid explosion risks.

In embodiments of this invention, the pipeline purging and vacuum creation is accomplished using a vacuum and/or compressor system. Air can be purged through an exhaust port of the vacuum and/or compressor system to an external environment. The purged air can be monitored via sensors for any presence of fuel. If a predetermined dangerous level of the fuel gas is detected in the pipeline, such as at a value approaching a lower explosive limit for the fuel gas, the system can be shut down and/or issue an alarm.

In embodiments of this invention, the vacuum and/or compressor system is attached to the pipeline via an interlock system that allows operator access to the at least a section of the pipeline for gas sampling.

In embodiments of this invention, the method includes: closing the at least a section of the pipeline from a fuel gas source; emptying the at least a section of the pipeline of remaining fuel gas by creating a first vacuum within the at least a section of the pipeline; filling the first vacuum with air; purging the air from the at least a section of the pipeline with a second vacuum; and filing the second vacuum with the fuel gas. This can be particularly useful for repair, replacement, or addition of new pipeline sections. Each of the first and second vacuums can be created with a vacuum and/or compressor system attached to the pipeline. The removed fuel gas can be sent to a second pipeline or a storage vessel, while the purged air can be exhausted to an external environment.

The invention further includes a system for implementing the above methods. In embodiments of this invention, a system for performing a purge of a pipeline includes a vacuum and/or compressor system configured to connect with the pipeline. A monitoring system can be connected with respect to the pipeline, such as integrated with the vacuum and/or compressor system, to identify leaks and/or concentrations of fluids within the pipeline and/or concentrations of fluids within the vacuum and/or compressor system. In embodiments of this invention, the system includes an identification of one or more prescribed vacuum states, and/or an interlock to isolate samples for the monitoring system.

The vacuum and/or compressor system can be desirably configured to empty the pipeline of remaining fuel gas by creating a vacuum within the at least a section of the pipeline, and the vacuum is then filled with air. The system can also be used to purge air from the pipeline with a vacuum for first commissioning of a new pipeline, or recommissioning the pipeline after a first fuel vacuum and air filling, to allow the vacuum to be filled with a new supply of the fuel gas.

The vacuum and/or compressor system includes an exhaust port connected to an external environment. The exhaust port or a second exhaust port can desirably be used to connect to a second pipeline or other vessel for fluids that should not be vented to the environment.

Other objects and advantages will be apparent to those skilled in the art from the following detailed description taken in conjunction with the appended claims and drawings.

DETAILED DESCRIPTION

The subject invention addresses the need to safely and responsibly purge a pipeline. The pipeline may contain gaseous, non-gaseous, condensable, or non-condensable fluid. The apparatus and method of this invention remove the fluid, creating a vacuum in its place within a pipeline, and then, when desired, filing the vacuum with a replacement material, such as a fuel gas. For example, the invention provides for removing gaseous fuel or air from a pipeline, or a section thereof, for replacement by, for example, the other of the gaseous fuel or air. The goal is to reduce or eliminate mixing of fuel and an oxidant within the pipeline, to minimize or avoid explosion risks.

The subject invention improves the process of performing purges in gas pipelines by improving the process from that of the current art by, without limitation: 1) identifying target states for adequate vacuum states that meet pipeline volume, sea-level height, and atmospheric pressure conditions; 2) providing a method to improve the overall safety and efficiency of purging a fluid pipeline with a vacuum/compressor; 3) providing a safety monitoring system to alert the operator of leaks and possibly shutdown the vacuum so as not to cause damage to the vacuum/compressor, but also prevent a potentially explosive concentration of flammable process fluid; 4) providing an interlock to sample process fluid concentration in lieu of a purge stack; 5) providing a vacuum/compressor seal fitting for attachment to pipelines; and/or 6) providing the potential solution to vacuum purge fluid pipelines into and/or out of service where no such solutions can satisfy both conditions.

Figure 1:
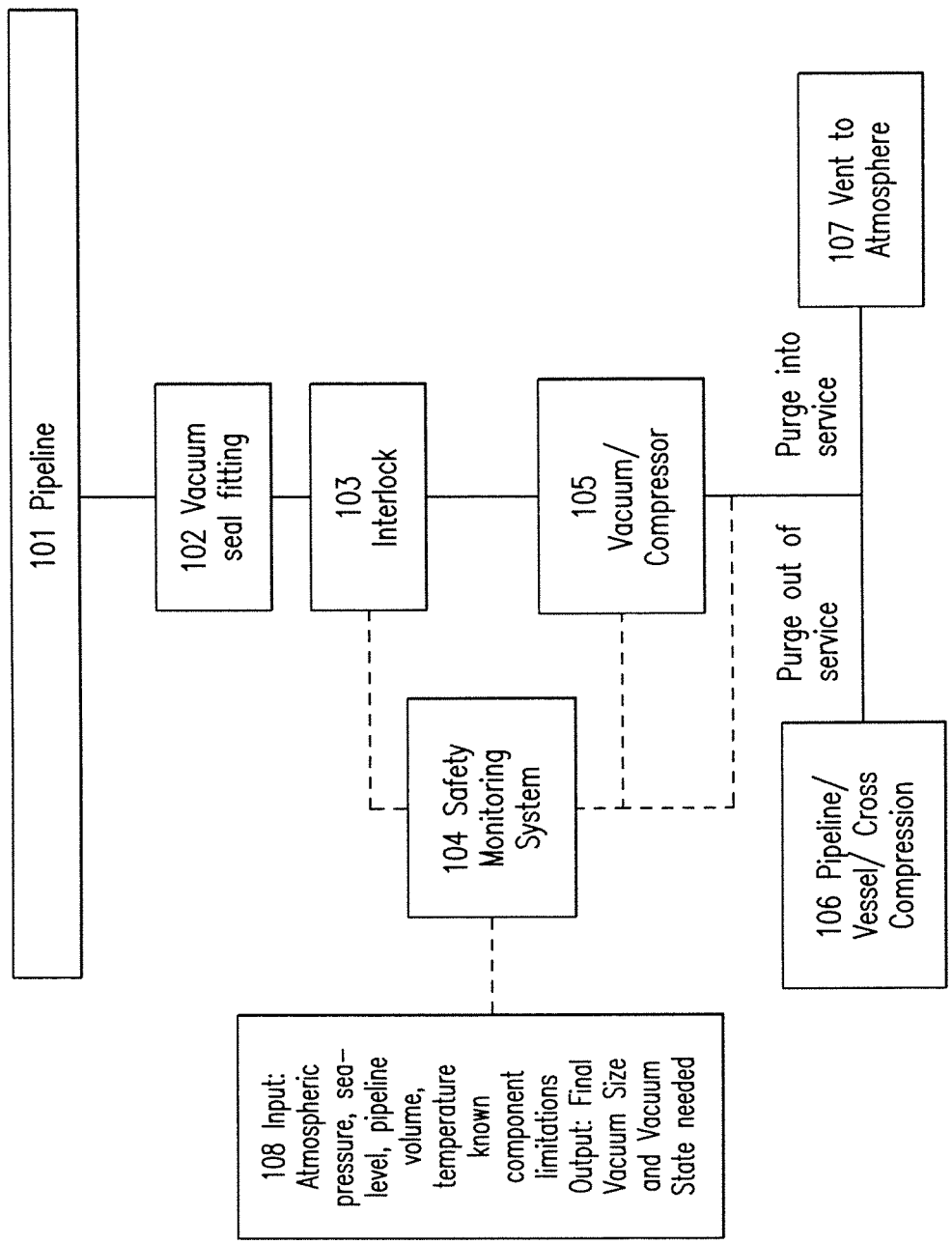
FIG. 1 representatively illustrates a pipeline purging system according to one embodiment of this invention.

An exemplary purge system according to embodiments of this invention is representatively illustrated in FIG. 1. Excess or otherwise undesirable fluid contained within pipeline 101, such as a process fluid, flammable fuel gas, or air, is to be exported safely and in a responsible manner. To export this fluid, vacuum seal fitting 102 is attached to the pipeline to transfer fluid from the pipeline through a vacuum and/or compressor apparatus 105. Interlock system 103, between the seal 102 and the apparatus 105, or part of the apparatus 105, preferably provides an operator access to the process fluid for gas sampling. In other embodiments of this invention, gas sampling can take place between vacuum seal fitting 102 and apparatus 105, from part of the apparatus 105, or between apparatus 105 and step 106 or 107.

Safety monitoring system 104 preferably provides analysis of the process fluid to monitor the presence of explosive gas within or surrounding system 100. If the process fluid exported through system 100 is benign, it can be vented to the atmosphere 107. If, instead, the process fluid has a potential negative environmental impact, then the fluid should be transferred to a holding vessel or compressed into an adjacent pipeline 106. Atmospheric and pipeline conditions can dictate prescribed vacuum pressures for operation. As shown in FIG. 1, the safety monitoring system 104 can be connected to the purge system upstream and/or downstream of the vacuum and/or compressor apparatus 105, and/or within the vacuum and/or compressor apparatus 105.

The safety monitoring system 104 allows the operator to know if unwanted fuel gas is entering the system. This can pose a negative environmental impact but it can also pose a safety concern (if the level of gas reaches the lower explosive limit of that fuel gas). The monitoring system of embodiments of this invention can also provide information on the proper purging of the system. It can be used to internally verify (without venting gas to the atmosphere to check gas concentration levels) that the appropriate percentages of gas in the system have been achieved. Either a sufficiently high enough concentration of fuel gas when purging a line into service or a sufficiently low enough concentration of fuel gas when purging a line out of service.

In embodiments of this invention, one or more predetermined inputs 108 can provide operator and/or system guidance on a final vacuum pressure needed for safe operation/filling. Factors such as atmospheric pressure, elevation, pipeline volume, fluid materials involved, and/or temperature can be used by the operator or a control device of the vacuum and/or compressor apparatus 105 to determine the desired vacuum level needed for operation and/or the desired final vacuum state within the pipeline. In embodiments of this invention, these factors are automatically considered in a computation by a data processor of a control device of the vacuum and/or compressor system, such as by manual inputs, and/or sensor readings.

Figure 2:
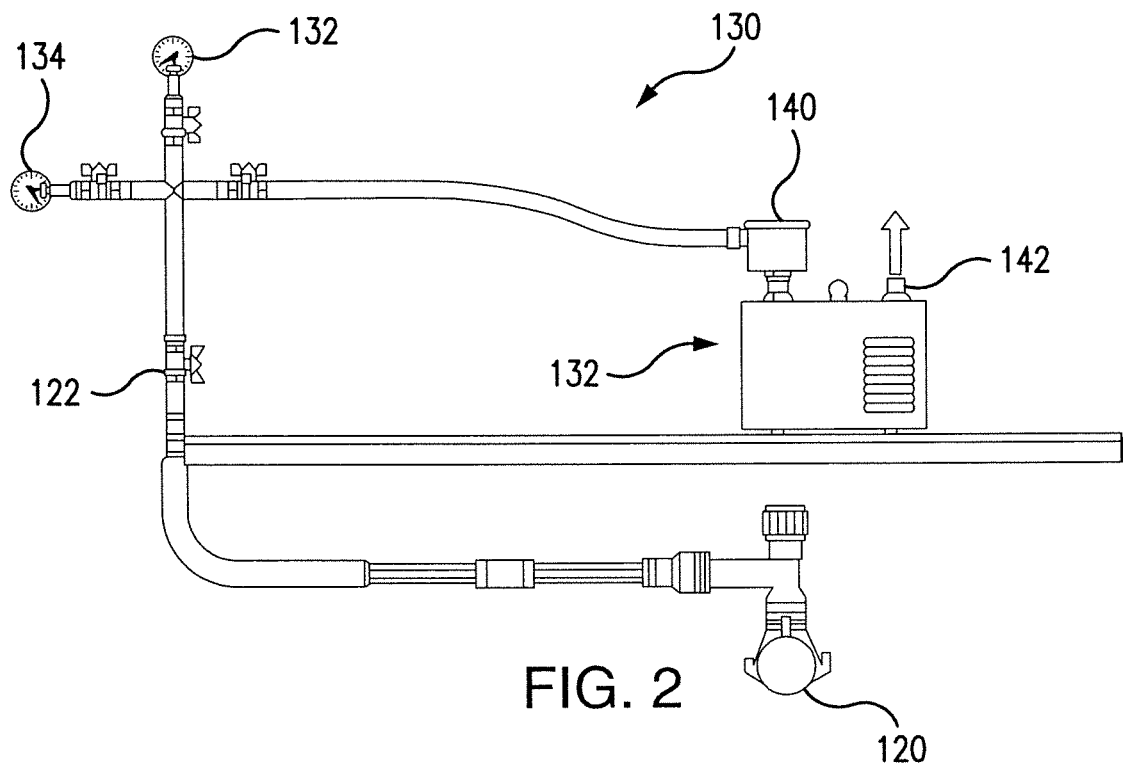
FIG. 2 shows a pipeline purging system according to one embodiment of this invention.

FIG. 2 illustrates a pipeline purge for a pipeline 120, such as a new pipeline installation. The pipeline 120 includes a purge valve 122, such as exposed above the ground. A system 130 for performing a purge of a pipeline 120 is connected to the purge valve 122. The system 130 includes a vacuum and/or compressor system 132 connected to the purge valve 122. A vacuum gauge 132 and a pressure gauge 134 are included in the connection, if not already present at the purge valve 122, to monitor the pipeline status. The vacuum and/or compressor system 132 is desirably a portable system that can be moved as needed between pipelines. The vacuum and/or compressor system 132 includes an interlock 140, such as with an operator access, at an inlet of the system 132. A vacuum pump or equivalent is located internally of the system 132 to pump a fluid from the pipeline 120, and out though outlet 142 to the surrounding environmental atmosphere. The valve 122 is then closed to allow the fluid to enter the pipeline without venting.

Figure 3:
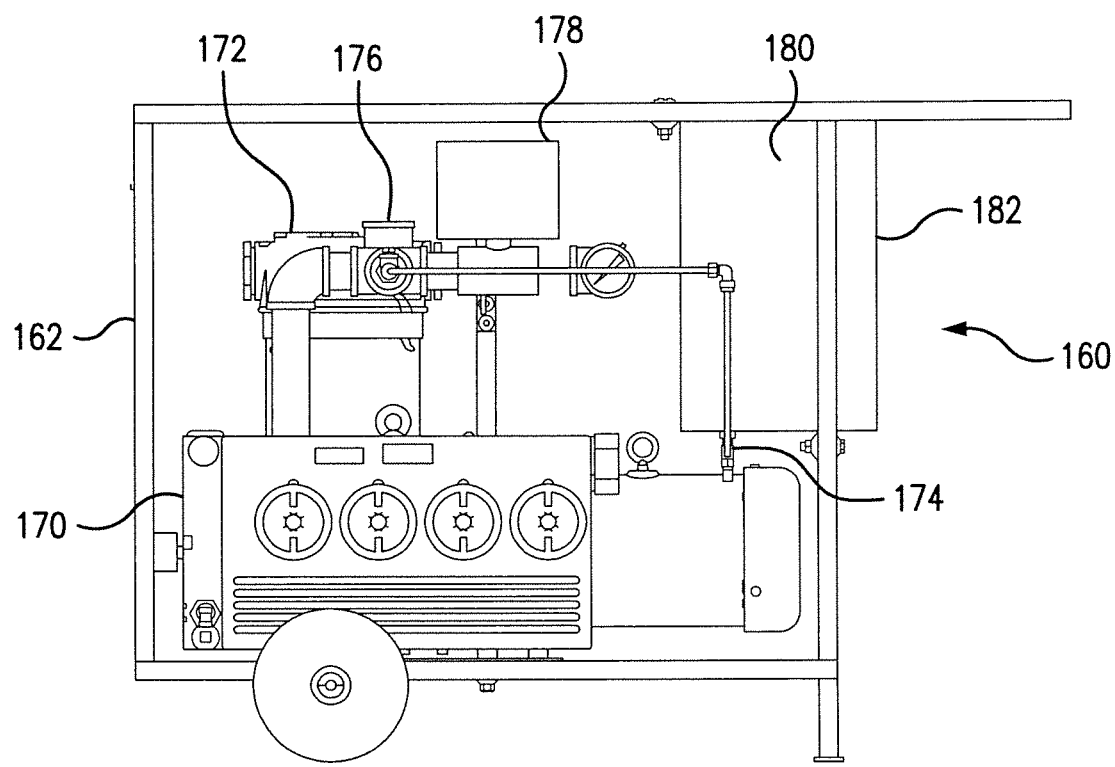
FIG. 3 is a vacuum and/or compressor system according to one embodiment of this invention.

FIG. 3 illustrates a vacuum and/or compressor system 160 according to one embodiment of this invention. The system 160 is housed in a wheeled frame 162, for example, a cart-like frame, for transport between pipeline sites. The system 160 includes a vacuum pump 170, an inlet filter 172, a pressure transmitter 174, a vacuum level indicator (e.g., gauge) 176, and an electric modulating valve 178. A controller 180 is connected to the vacuum pump 170, and to the pressure transmitter 174. The controller 180 includes a data processor and an external control panel 182 for operator control. The system is pre-wired and pre-piped for single point electrical and vacuum connections. As will be appreciated various sizes, shapes, power, and other configurations are available for the system components, depending on need.

Figure 4:
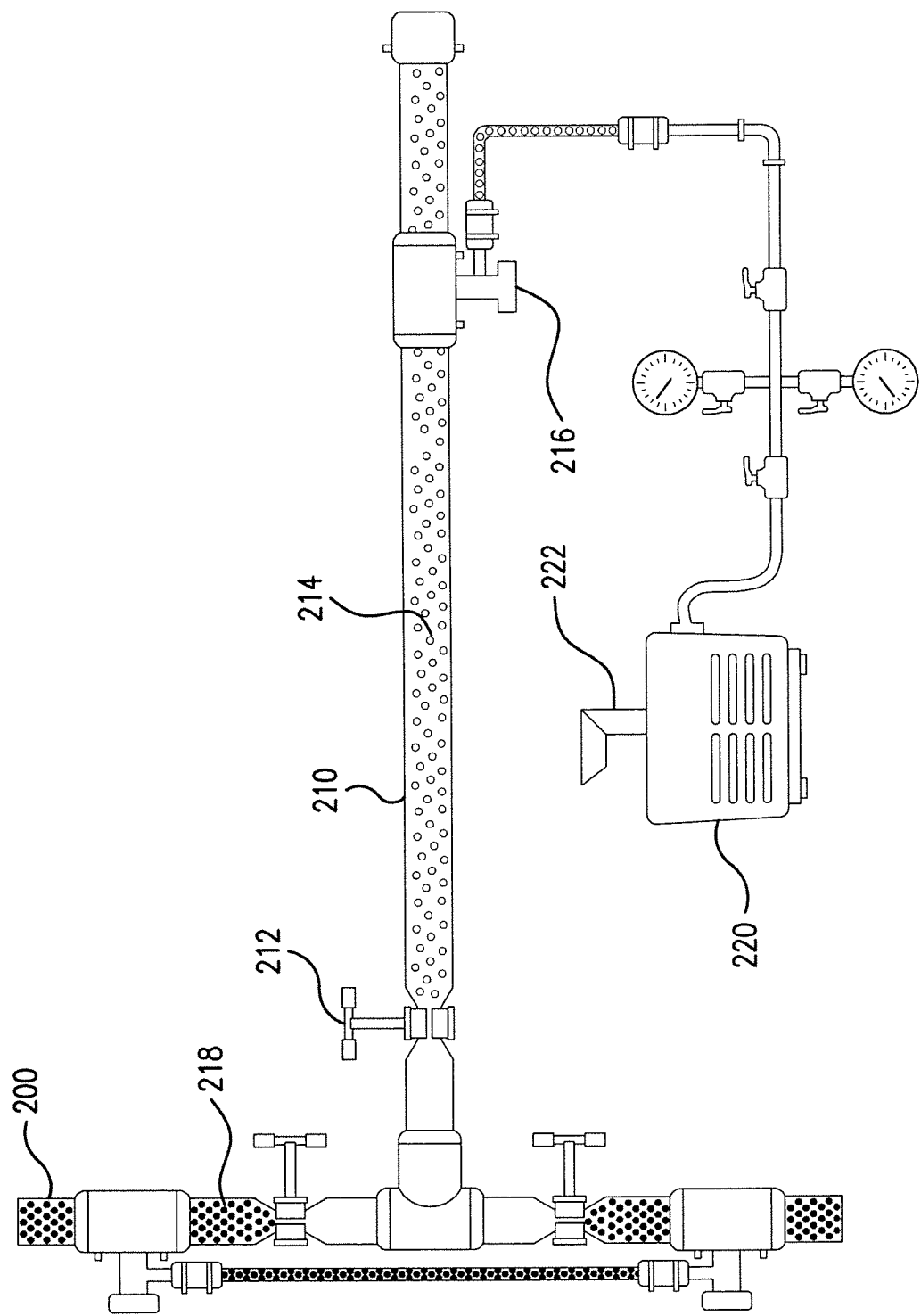
FIGS. 4 and 5 illustrate a pipeline purge according to embodiments of this invention.
Figure 5:
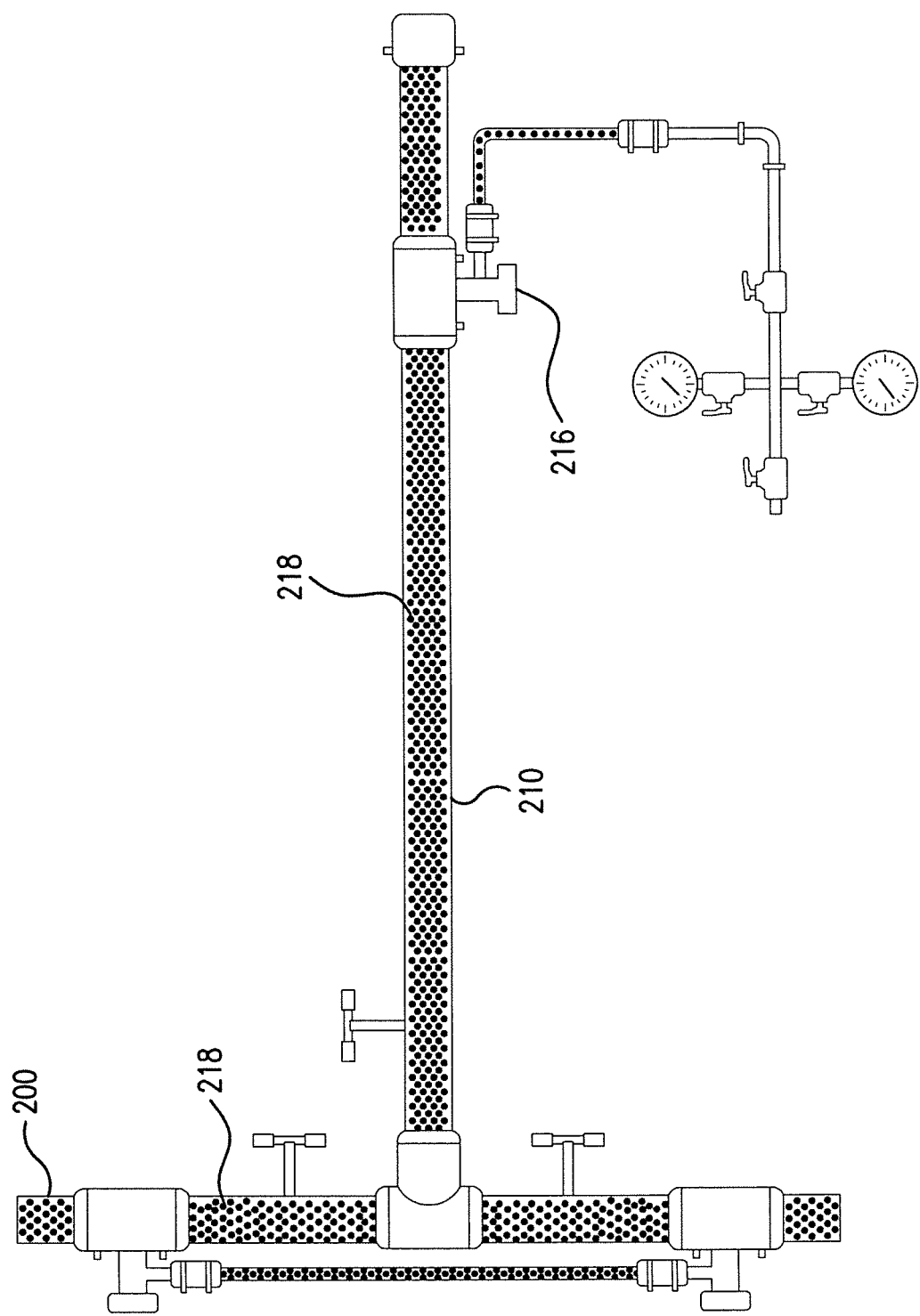

FIGS. 4 and 5 illustrate a purging of a pipeline segment 210 according to embodiments of this invention. In FIG. 4, the pipeline segment 210 is shut off from the remaining pipeline 200, such as by valve 212. The dots 214 within the pipeline segment 210 represent air that needs to be removed to commission/recommission segment 210. Vacuum and/or compressor system 220 according to this invention is connected to a pipeline purge valve 216. The system 220 creates a vacuum within the pipeline segment 210 by removing the air 212 to the atmosphere out exhaust port 222. Upon reaching the desired vacuum state, the purge valve 216 is closed and valve 212 is opened or otherwise removed to allow the natural gas 218 into the new section of pipe 210 to fill the vacuum, without the need to vent any air or any gas to atmosphere. This allows the new pipeline to be commissioned (placed into service) without venting methane (greenhouse gas) to the atmosphere and not producing a dangerous mixture of gas and air (explosive mixture) within the new pipeline.

In embodiments of this invention, a monitoring system connected with respect to the pipeline and the vacuum and/or compressor system is used to identify leaks and/or concentrations of fluids within the pipeline segment 210 and/or concentrations of fluids within the vacuum and/or compressor system 220. For example, the monitoring system can detect leaks occurring through valve 212. The monitoring system can be integrated with the system 160, and include sensors in combination with the purging air stream, such as within the exhaust port 222.

In embodiments of this invention where the pipeline segment 210 is already in service, but needs to be emptied for repair, etc., the system 220 can first be used to create a first vacuum by removing any remaining gas in the closed-off segment 210. The first vacuum can be filled with air as shown in FIG. 4, and then recommissioned as described for FIGS. 4 and 5.

Thus the invention provides a method and system for pipeline purging with reduced environmental impact. By the present invention, methane emissions can be reduced to zero or near zero. The invention provides increased safety by minimizing a possibility of generating explosive atmospheres inside the pipe and also during the venting of the natural gas to the atmosphere during the purging process. The invention reduces natural gas loss generated during purge process (unaccountable gas losses), and reduces or eliminates a need for nitrogen as an inerting agent (sometimes used during a purging process).

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

We claim:

1. A method for pipeline purging, the method comprising:
   creating a vacuum within at least a section of the pipeline by purging air or other non-combustible gases from the at least a section of the pipeline with a vacuum and/or compressor system, wherein the air is purged through an exhaust port of the vacuum and/or compressor system to an external environment;
   monitoring via sensors for any fuel gas within the purging air; and
   automatically issuing an alarm and/or automatically stopping the vacuum and/or compressor system upon detection of a predetermined dangerous level of the fuel gas, at a value approaching a lower explosive limit for the fuel gas in the pipeline; and
   filling the vacuum with a fuel gas.

2. The method of claim 1, wherein the fuel gas is a flammable gas.

3. The method of claim 1, wherein the fuel gas includes natural gas, hydrogen, and/or methane.

4. The method of claim 1, further comprising:
   closing a fuel gas inlet to the at least a section of the pipeline before the creating the vacuum; and
   opening the fuel gas inlet upon reaching a predetermined vacuum pressure within the at least a section of the pipeline.

5. The method of claim 1, wherein the vacuum and/or compressor system is attached to the pipeline via an interlock system that allows operator access to the at least a section of the pipeline for gas sampling.

6. The method of claim 1, wherein the vacuum removes existing fuel gas for pipeline repair or decommissioning.

7. A method for pipeline purging, the method comprising:
   creating a vacuum within at least a section of the pipeline by purging air or other non-combustible gases from the at least a section of the pipeline with a vacuum and/or compressor system, wherein the vacuum and/or compressor system is attached to the pipeline via an interlock system that allows operator access to the at least a section of the pipeline for gas sampling; and
   filling the vacuum with a fuel gas.

8. The method of claim 7, wherein the air is purged through an exhaust port of the vacuum and/or compressor system to an external environment, and further comprising:
   monitoring via sensors for any fuel gas within the purging air; and
   automatically issuing an alarm and/or automatically stopping the vacuum and/or compressor system upon detection of a predetermined dangerous level of the fuel gas, preferably at a value approaching a lower explosive limit for the fuel gas in the pipeline.

9. The method of claim 7, further comprising:
   monitoring the at least a section of the pipeline and/or the vacuum and/or compressor system to identify leaks and/or a concentration of a fluid within at least a section of the pipeline and/or concentrations of fluids within the at least a section of the pipeline or the vacuum and/or compressor system.

10. The method of claim 9, further comprising:
    automatically stopping the vacuum and/or compressor system upon detection of a leak.

11. A method for pipeline purging, the method comprising:
    closing at least a section of the pipeline from a fuel gas source;
    creating a first vacuum within the at least a section of the pipeline by emptying the at least a section of the pipeline of remaining fuel gas;
    filling the first vacuum with air;
    purging the air from the at least a section of the pipeline with a second vacuum; and
    filling the second vacuum with the fuel gas.

12. The method of claim 11, further comprising:
    removing the remaining fuel gas to a second pipeline or a storage vessel.

13. The method of claim 12, further comprising:
purging the air through an exhaust port to an external environment.

14. The method of claim 13, wherein each of the first and second vacuums are created with a vacuum and/or compressor system.

15. The method of claim 14, further comprising:
monitoring via sensors for any fuel gas within the purging air; and
automatically issuing an alarm and/or automatically stopping automatically stopping the vacuum and/or the compressor upon detection of a predetermined dangerous level of the fuel gas within the purging air.

16. The method of claim 11, wherein each of the first and second vacuums are created with a vacuum and/or compressor system, and the vacuum and/or compressor system is attached to the pipeline via an interlock system that allows operator access to the at least a section of the pipeline for gas sampling.

* * * * *